(12) United States Patent
Moore

(10) Patent No.: US 6,259,791 B1
(45) Date of Patent: Jul. 10, 2001

(54) METHOD AND APPARATUS IN A WIRELESS MESSAGING SYSTEM FOR CONTROLLING A HIERARCHICAL PROVISION OF SERVICE

(75) Inventor: Morris Anthony Moore, Southlake, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/031,269

(22) Filed: Feb. 26, 1998

(51) Int. Cl.[7] .................................. H04L 9/08; H04Q 7/10
(52) U.S. Cl. ..................... 380/271; 380/277; 455/552; 455/419
(58) Field of Search .................................. 380/271, 273, 380/247, 277; 455/434, 551, 552, 432, 31.3, 419

(56) References Cited

U.S. PATENT DOCUMENTS

| | | | |
|---|---|---|---|
| 4,839,628 | * | 6/1989 | Davis et al. ............... 340/311.1 |
| 5,012,234 | * | 4/1991 | Dulaney et al. ............ 340/825.44 |
| 5,247,519 | | 9/1993 | Snowden et al. . |
| 5,381,138 | | 1/1995 | Stair et al. . |
| 5,432,839 | * | 7/1995 | DeLuca ............................ 379/57 |
| 5,555,446 | | 9/1996 | Jasinski . |

OTHER PUBLICATIONS

Bruce Schneier, Applied Cryptology, 2e, pp. 1–3, Oct. 1995.*

* cited by examiner

Primary Examiner—Gilberto Barron, Jr.
Assistant Examiner—James Seal
(74) Attorney, Agent, or Firm—R. Louis Breeden

(57) ABSTRACT

A first service provider having a highest security of access, initially programs (604) tables in a subscriber unit (122), including an address table (224) having entries including addresses to which the subscriber unit is responsive, a sub-address table (226) including a sub-address identifier and a corresponding first pointer to a first decryption key for an algorithm required to decrypt a sub-message associated with the sub-address identifier, and a key table (228) including the first decryption key. A second service provider having a security of access less than that of the first service provider reprograms (606) an attribute of at least one of the sub-address table and the key table. The second service provider obtains reprogramming access by encrypting a first reprogramming message such that it can be properly decrypted using the first decryption key.

19 Claims, 4 Drawing Sheets

METHOD AND APPARATUS IN A WIRELESS MESSAGING SYSTEM FOR CONTROLLING A HIERARCHICAL PROVISION OF SERVICE

FIELD OF THE INVENTION

This invention relates in general to wireless communication systems, and more specifically to a method and apparatus in a wireless messaging system for controlling a hierarchical provision of service.

BACKGROUND OF THE INVENTION

Current practice in wireless messaging systems makes the loading of addresses, including information services (IS) addresses, into a wireless messaging device such as a pager, the domain of the wireless service provider. These addresses can be loaded at manufacture, or later by fairly restricted means, and only with the participation in one form or another of the wireless service provider.

In the context of information services, it is desirable to provide a means of authorizing an IS provider to modify attributes of the IS subscription in the subscriber unit. It is also required, however, that the IS provider ONLY be able to modify attributes within the authorized areas of the IS provider and nowhere else. In addition, because the wireless service provider "owns" the subscriber, the wireless service provider preferably should control the finite resources in the subscriber unit that are allocated to storing addresses and associated information, IS topic subscription information, and encryption keys.

Thus, what is needed is a method and apparatus in a wireless messaging system for controlling a hierarchical provision of service, as between, for example, the wireless service provider and an IS provider. The method and apparatus preferably will allow each provider to control selected attributes within areas appropriate to each provider.

SUMMARY OF THE INVENTION

An aspect of the present invention is a method in a wireless messaging system for a hierarchical provision of service, comprising the steps of initially programming, by a first service provider having a highest security of access, a plurality of tables in a subscriber unit, the plurality of tables comprising: an address table having entries comprising addresses to which the subscriber unit is responsive; a sub-address table comprising a sub-address identifier and a corresponding first pointer to a first decryption key for an algorithm required to decrypt a sub-message associated with the sub-address identifier; and a key table comprising the first decryption key. The method further comprises the step of reprogramming, by a second service provider having a security of access less than that of the first service provider, an attribute of at least one of the sub-address table and the key table. The second service provider obtains reprogramming access by encrypting a first reprogramming message such that it can be properly decrypted using the first decryption key.

Another aspect of the present invention is a subscriber unit in a wireless messaging system for a hierarchical provision of service, comprising a receiver for receiving a message, a processing system coupled to the receiver for processing the message, and a user interface coupled to the processing system for interfacing with a user. The processing system comprises a memory for storing a plurality of tables initially programmed by a first service provider having a highest security of access, the plurality of tables comprising: an address table having entries comprising addresses to which the subscriber unit is responsive; a sub-address table comprising a sub-address identifier and a corresponding first pointer to a first decryption key for an algorithm required to decrypt a sub-message associated with the sub-address identifier; and a key table comprising the first decryption key. The processing system is programmed to allow a second service provider having a security of access less than that of the first service provider to reprogram an attribute of at least one of the sub-address table and the key table by encrypting a first reprogramming message such that it can be properly decrypted using the first decryption key.

Another aspect of the present invention is a controller in a wireless messaging system operated by a first service provider having a highest security of access, the controller for a hierarchical provision of service. The controller comprises a network interface for receiving a message from a message originator, and a processing system coupled to the network interface for processing the message. The controller further comprises a base station interface coupled to the processing system for controlling a base station to transmit the message, and a second service provider interface coupled to the processing system for accepting information from a second service provider. The processing system is programmed to initially download a plurality of tables to a subscriber unit, the plurality of tables comprising: an address table having entries comprising addresses to which the subscriber unit is responsive; a sub-address table comprising a sub-address identifier and a corresponding first pointer to a first decryption key for an algorithm required to decrypt a sub-message associated with the sub-address identifier; and a key table comprising the first decryption key. The processing system is further programmed to allow the second service provider, having a security of access less than that of the first service provider, to reprogram an attribute of at least one of the sub-address table and the key table by sending a first reprogramming message to the subscriber unit, the first reprogramming message encrypted such that it can be properly decrypted using the first decryption key.

DETAILED DESCRIPTION OF THE DRAWINGS

Figure 1:
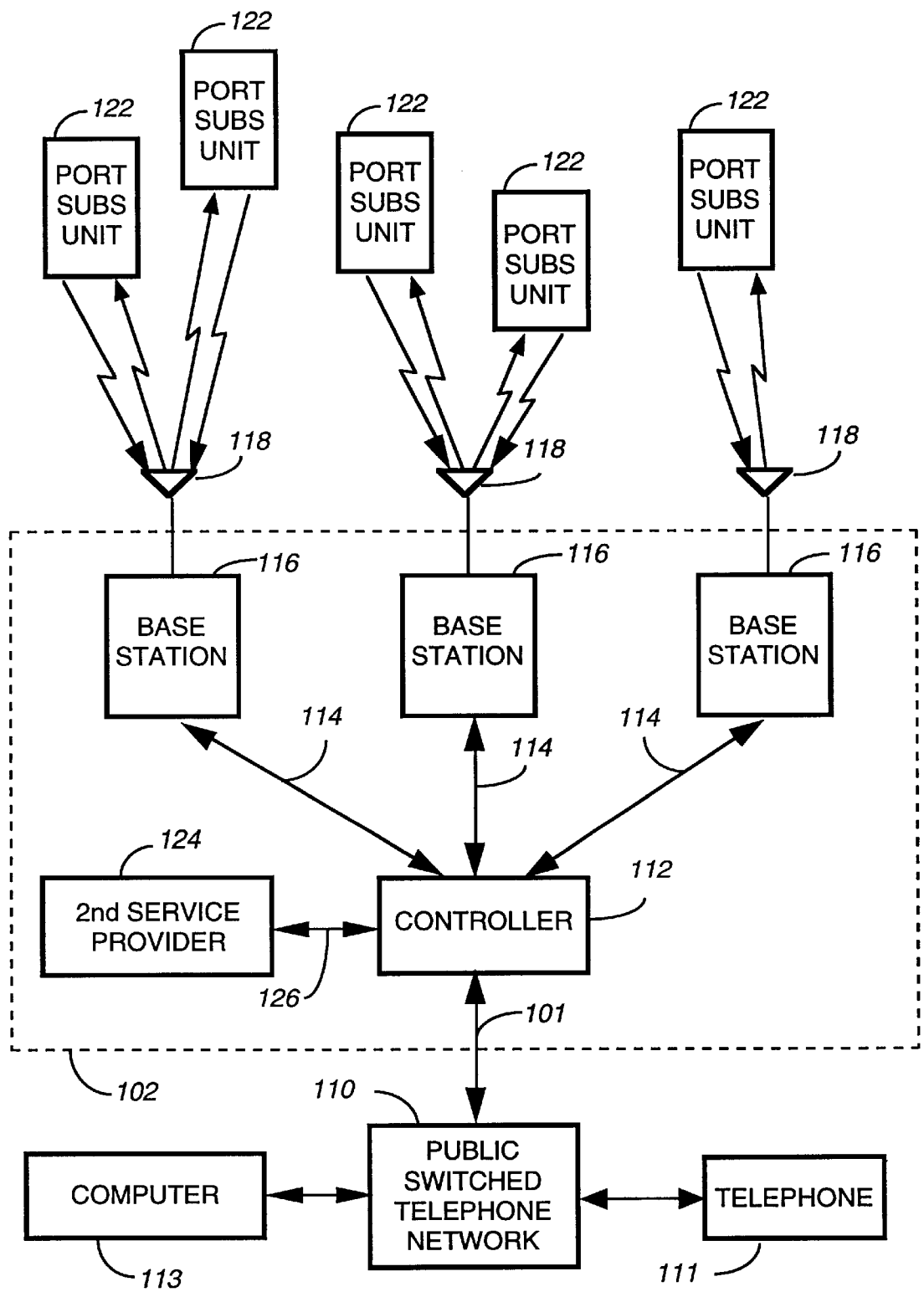
FIG. 1 is an electrical block diagram of an exemplary wireless messaging system in accordance with the present invention.

Referring to FIG. 1, an electrical block diagram of an exemplary wireless messaging system in accordance with the present invention comprises a fixed portion 102 including a controller 112 operated by a first service provider, a second service provider facility 124 coupled to the controller 112 through a conventional communication link 126, and a plurality of base stations 116. The wireless messaging system also includes a portable portion including a plurality of portable subscriber units 122, preferably having acknowledge-back capability. The base stations 116 preferably communicate with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc., and includes software modified in accordance with the present invention. The hardware of the base stations 116 is preferably a combination of the RF-Orchestra! transmitter and RF-Audience!™ receivers manufactured by Motorola, Inc. The portable subscriber units 122 are preferably similar to Pagewriter™ data messaging units, also manufactured by Motorola, Inc., and having software modified in accordance with the present invention. It will be appreciated that other similar hardware can be utilized as well for the controller 112, the base stations 116, and the portable subscriber units 122.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and voice and data messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 113 coupled to the PSTN 110. It will be appreciated that, alternatively, other types of communication networks, e.g., packet switched networks and local area networks, can be utilized as well for transporting originated messages to the controller 112.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well. It will be further appreciated that, with some limitations, the present invention can also be applied to a one-way wireless messaging system as well.

Figure 2:
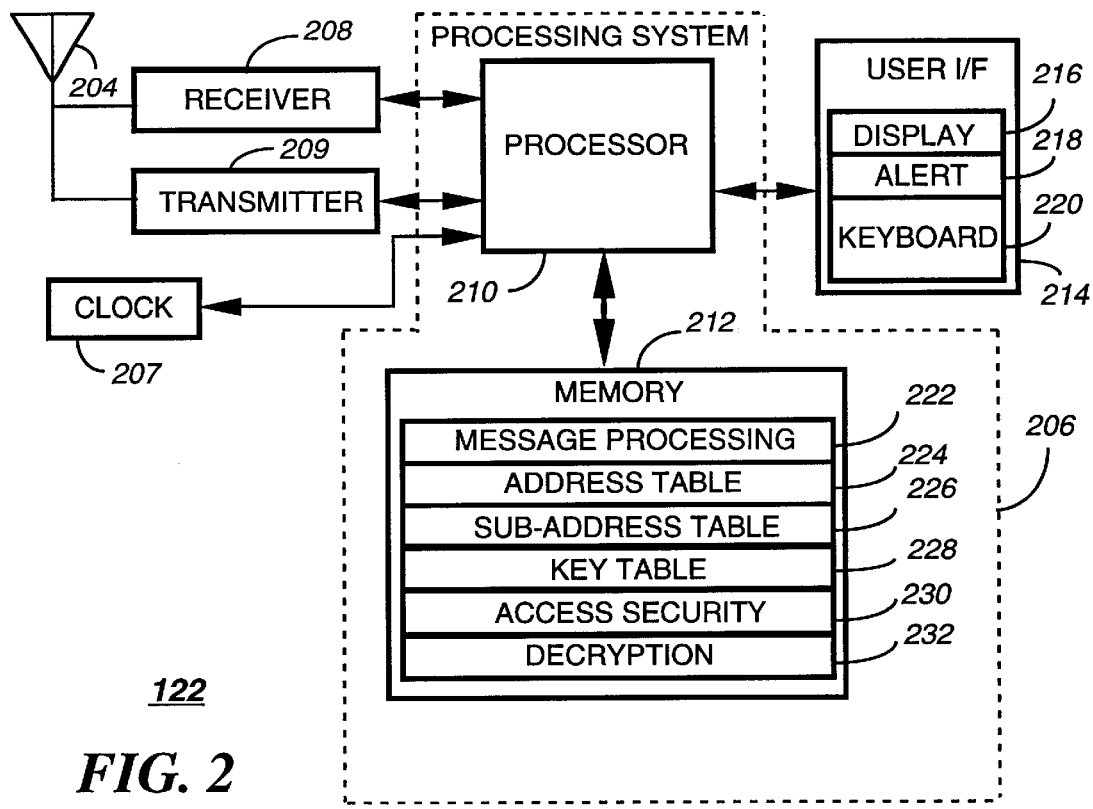
FIG. 2 is a electrical block diagram of an exemplary subscriber unit in accordance with the present invention.

FIG. 2 is an electrical block diagram of an exemplary portable subscriber unit 122 in accordance with the present invention. The portable subscriber unit 122 comprises an antenna 204 for intercepting an outbound message and for transmitting an inbound message. The antenna 204 is coupled to a conventional receiver 208 for receiving the outbound message and is also preferably coupled to a conventional transmitter 209 for transmitting the inbound message. The receiver 208 and the transmitter 209 are coupled to a processing system 206 for processing the outbound and inbound messages and for controlling the portable subscriber unit 122 in accordance with the present invention. A user interface 214 is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the portable subscriber unit 122. A conventional clock 207 is also coupled to the processing system 206 for supporting time keeping requirements in accordance with the present invention.

The processing system 206 comprises a conventional processor 210 and a conventional memory 212. The memory 212 comprises software elements and databases for programming the processing system 206 in accordance with the present invention. The memory 212 further comprises a message processing element 222 for processing a message in accordance with the present invention. The memory 212 also includes an address table 224 for storing selective call addresses to which the subscriber unit 122 is responsive. The address table also preferably includes status information, such as an indicator for indicating whether an address is enabled or disabled. In addition, the memory 212 includes a sub-address table 226 for storing sub-address identifiers for identifying sub-addresses to which the subscriber unit is responsive. The sub-address identifiers can be used, for example, to identify information services (IS) topics active in the subscriber unit 122. The sub-address table preferably also includes at least one first pointer to at least one first decryption key utilized by an algorithm for decrypting a sub-message associated with a sub-address in the sub-address table 226. In addition, the sub-address table 226 preferably includes at least one sub-address enabler for indicating whether a corresponding sub-address is enabled. The sub-address table 226 preferably also includes at least one address pointer for identifying an address associated with each sub-address therein. The memory 212 also includes a key table 228 for storing the at least one first decryption key. The memory 212 further comprises an access security element 230 for controlling access for programming and reprogramming the address, sub-address, and key tables 224, 226, 228. In addition, the memory 212 includes a decryption element 232 for decrypting a message from the second service provider in accordance with the present invention. In accordance with one aspect of the present invention, the address table 224 further comprises at least one second pointer to at least one second decryption key associated with at least one address in the address table 224. It will be appreciated that in a practical subscriber unit 122 additional information not described above and not germane to the instant invention may be required in the address, sub-address, and key tables 224, 226, 228.

Figure 3:
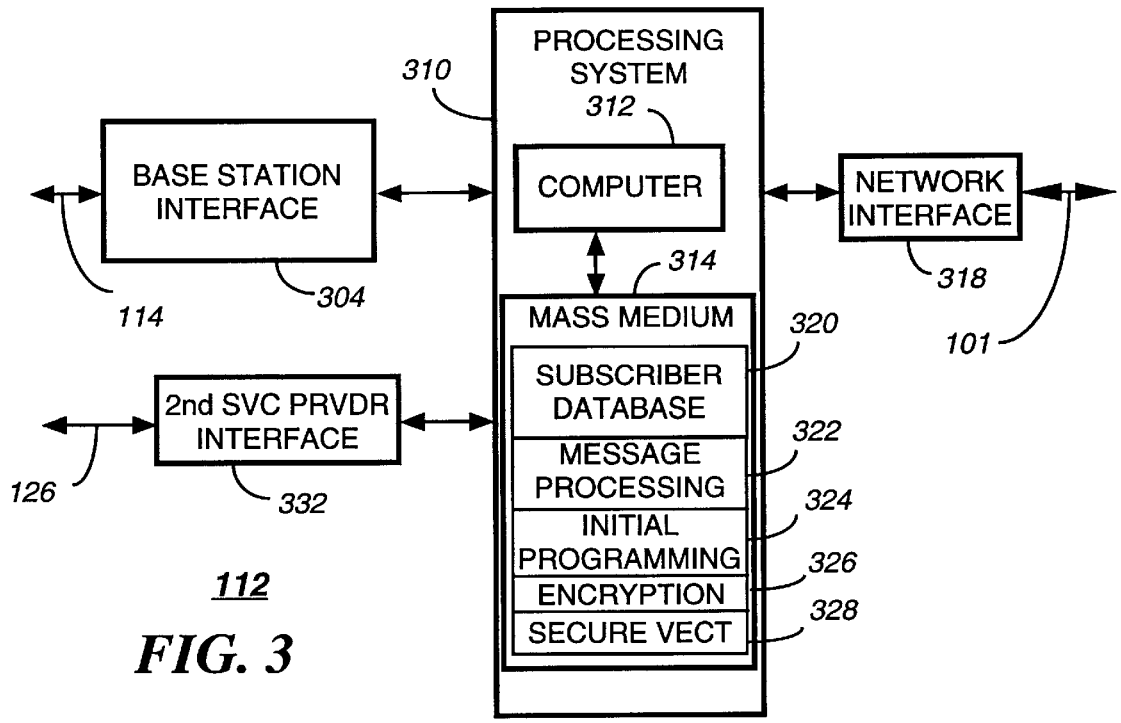
FIG. 3 is a electrical block diagram of an exemplary controller in accordance with the present invention.

FIG. 3 is an electrical block diagram of an exemplary controller 112 in accordance with the present invention. The controller 112 comprises a processing system 310 for executing the operations of the controller 112. The processing system 310 is coupled to a conventional network interface 318 for receiving messages through the telephone links 101. The processing system 310 is also coupled to a conventional base station interface 304 for controlling and communicating with the base stations 116 through the communication links 114. It will be appreciated that more than one base station interface 304 can be present, depending upon system size. In addition, the processing system 310 is coupled to a second service provider interface 332 for receiving messages and reprogramming information from the second service provider facility 124 via the communication link 126. It will be appreciated that, alternatively, the second service provider interface 332 can be omitted, and the second service provider facility 124 can access the controller 112 via the PSTN 110.

The processing system 310 comprises a conventional computer 312 and a storage element, preferably a conventional mass storage medium 314. The mass storage medium 314 includes, for example, a subscriber database 320, comprising subscriber information such as addressing and programming options of the portable subscriber units 122. The subscriber database 320 preferably includes sufficient information for each subscriber unit 122 "owned" by the first service provider to initially download tables to the subscriber unit 122. The tables preferably include the address table 224, the sub-address table 226, and the key table 228, described herein above.

The computer 312 is preferably programmed by way of software included in the mass storage medium 314 for providing the operations and features required in accordance with the present invention. The computer 312 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The mass storage medium 314 is preferably a conventional hard disk mass storage device. It will be appreciated that other types of conventional computers 312 can be utilized, and that additional computers 312 and mass storage media 314 of the same or alternative type can be added as required to handle the processing requirements of the processing system 310.

The mass storage medium 314 preferably includes a message processing element 322 for processing messages in accordance with the present invention. The mass medium 314 also includes an initial programming element 324 for initially programming the tables 224, 226, 228 by downloading the tables to the subscriber unit 122 using well-known techniques for sending over-the-air programming messages to the subscriber unit 122. In addition, the mass medium 314 includes an encryption element 326 for encrypting the programming messages in accordance with the present invention, using well-known encryption techniques. The mass medium 314 further comprises a secure vector 328 (preferably as defined by the FLEX™ protocol) for transmitting the programming messages in a secure manner. The processing system 310 is preferably programmed to allow the second service provider, e.g., an information services provider, to send messages to the subscriber unit 122 through the controller 112. Preferably, the second service provider is allowed to reprogram an attribute of the sub-address table 226 or the key table 228, or both, by sending a first reprogramming message to the subscriber unit 122, the first reprogramming message encrypted such that it can be properly decrypted using the first decryption key corresponding to the sub-address. In the event that the address table also includes a second pointer to a second decryption key corresponding to an address in the address table 224, the processing system 310 is further programmed to allow the second service provider to reprogram an attribute of the address table 224 by sending a second reprogramming message to the subscriber unit 122, the second reprogramming message encrypted such that it can be properly decrypted using the second decryption key. Whenever the second service provider performs reprogramming, the reprogramming information can be addressed to either a personal address of the subscriber unit 122, or to a group address of the subscriber unit 122. When sent to the personal address, the reprogramming information affects only a single subscriber unit 122. When sent to the group address, the reprogramming information can affect a plurality of subscriber units 122 at once.

Figure 4:
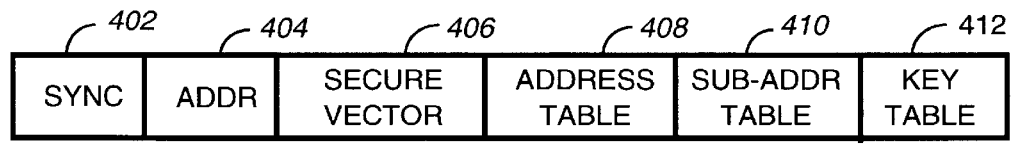
FIG. 4 is an exemplary protocol diagram depicting a structure suitable for sending an initial programming message from the controller to the subscriber unit in accordance with the present invention.

FIG. 4 is an exemplary protocol diagram 400 depicting a structure suitable for sending an initial programming message from the controller 112 to the subscriber unit 122 in accordance with the present invention. The diagram 400 comprises a synchronization portion 402 for synchronizing the subscriber unit 122 with signals transmitted by the fixed portion 102, using well-known techniques. The diagram 400 further comprises an address 404 for indicating the particular subscriber unit(s) 122 for which the initial programming message is intended. The diagram 400 also includes a secure vector 406 accessible only to the first service provider, e.g., a special vector not allowed to pass through either the network interface 318 or the second service provider interface 332, using well-known filtering techniques. The diagram 400 further comprises the address, sub-address, and key table information 408, 410, 412 for programming the address, sub-address, and key tables 224, 226, 228 of the subscriber unit(s) 122. Preferably, the initial programming information is sent as an over-the-air message to the subscriber unit(s) 122, using wellknown wireless transmission techniques. It will be appreciated that, alternatively, the initial programming information can be transferred to the subscriber unit(s) 122 during manufacture, or through a conventional field programming device, as well.

Figure 5:
FIG. 5 is an exemplary protocol diagram depicting a structure suitable for sending a reprogramming message from the controller to the subscriber unit in accordance with the present invention.

FIG. 5 is an exemplary protocol diagram 500 depicting a structure suitable for sending a reprogramming message from the second service provider facility 124 to the subscriber unit 122 in accordance with the present invention. The reprogramming message uses well-known techniques for indexing into a database to make modifications to the database. The second service provider, e.g., an information services (IS) provider, preferably sends the reprogramming message as an encrypted message using well-known encryption techniques. The reprogramming message preferably is encrypted such that it can be properly decrypted using a predetermined one of the first decryption keys associated with the sub-address identifiers programmed by the initial programming message of the diagram 400. The diagram 500 comprises a synchronization portion 502 for synchronizing the subscriber unit 122 with signals transmitted by the fixed portion 102, using well-known techniques. The diagram 500 further comprises an address 504 for indicating the particular subscriber unit(s) 122 for which the reprogramming message is intended. The diagram 500 also includes a reprogramming command 506 which distinguishes the reprogramming message from other messages, e.g., normal IS messages. The diagram 500 further includes at least one sub-address table attribute 508 or at least one key table entry, or both, according the preference of the second service provider. For the case of the IS provider, for example, the present invention advantageously allows the wireless service provider to control the resources assigned in the subscriber units 122, while also allowing the IS provider to control portions of the resources receiving service from the IS provider. Only the wireless service provider can add or delete, for example, a new address, sub-address, or key in the subscriber unit 122, while the IS provider who knows the appropriate encryption key to use for the reprogramming message can enable or disable existing addresses and sub-addresses, e.g., IS topics, and can also change the decryption key values. It will be appreciated that the IS provider can use the reprogramming message to change a single attribute associated with a single sub-address, or to change a plurality of attributes associated with a plurality of sub-addresses, depending upon the IS provider's needs.

Figure 6:
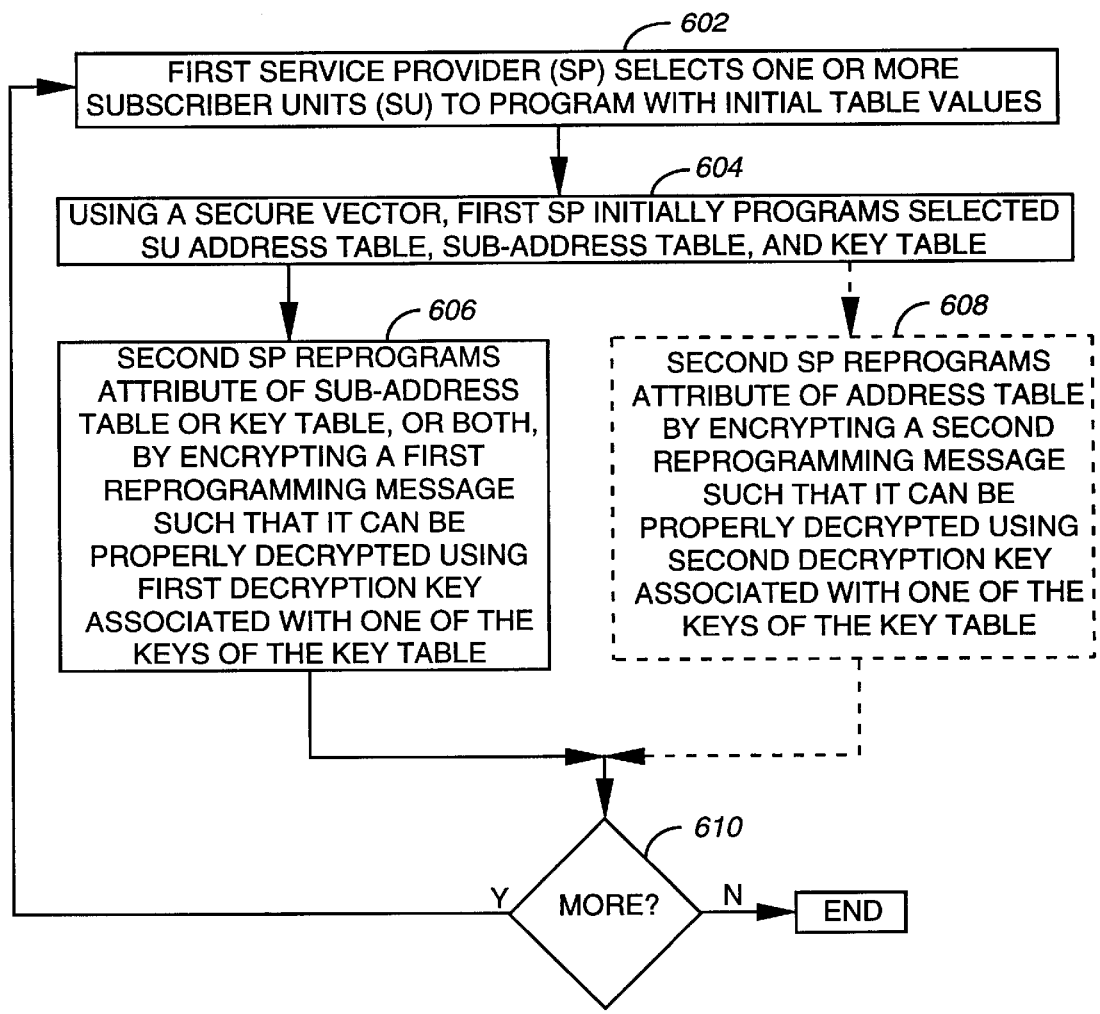
FIG. 6 is an exemplary flow diagram depicting a first operation of the wireless messaging system in accordance with the present invention.

FIG. 6 is an exemplary flow diagram 600 depicting a first operation of the wireless messaging system in accordance with the present invention. The flow begins when the first service provider selects 602 one or more subscriber units 122 to program with initial table values. When only a single subscriber unit 122 is to be programmed, the first service provider preferably uses a personal address of the subscriber unit 122. When a group of subscriber units 122 are to be programmed, the first service provider preferably uses a group address of the subscriber unit 122. The first service provider then preferably uses a secure vector, through the controller 112, to initially program 604 the address table 224, the sub-address table 226, and the key table 228 of the subscriber unit 122. Later, the second service provider can reprogram 606 an attribute of the sub-address table or of the key table, or both, by encrypting a first reprogramming message such that it can be properly decrypted using a first decryption key associated with a predetermined one of the keys of the key table, e.g., the key associated with a sub-address whose attribute is being changed. Alternatively, when the address table includes a second pointer to a second decryption key, the second service provider can reprogram 608 an attribute, e.g., the status of an address, of the address table by encrypting a second reprogramming message such that it can be properly decrypted using a second decryption key associated with a predetermined one of the keys of the key table, e.g., the second decryption key pointed to by the second pointer. If at step 610 there are additional subscriber units 122 to program, the flow returns to step 602. If not, the process ends. While the diagram 600 depicts the programming steps 602, 604 and the reprogramming steps 606, 608 in a continuous loop, it will be appreciated that the programming steps 602, 604 and the reprogramming steps 606, 608 actually are performed independently. In general, the programming steps preferably are performed once, for example when an IS subscription is started, and the reprogramming steps thereafter can be performed as often as needed for changing the service of the subscriber unit 122.

Figure 7:
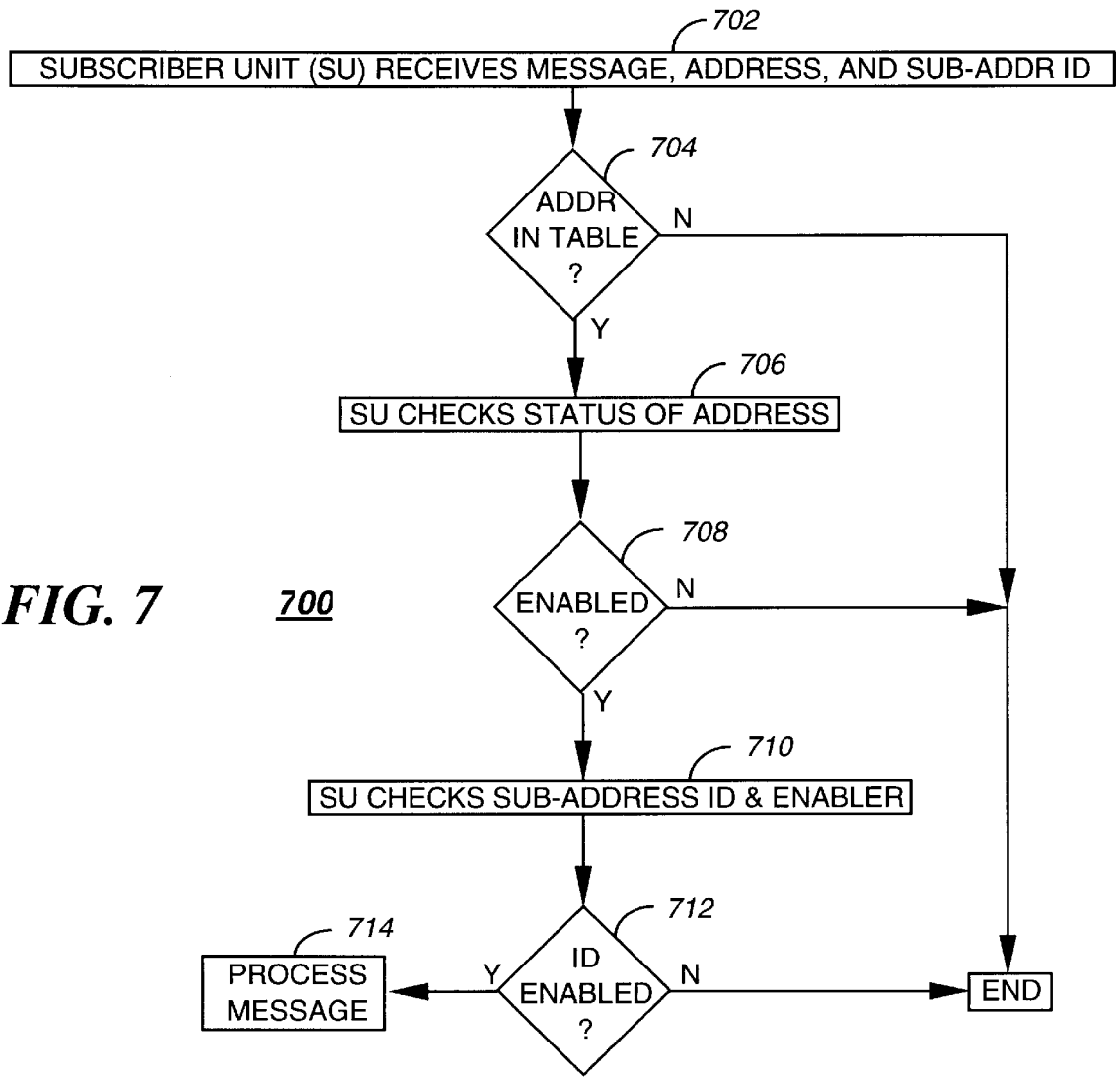
FIG. 7 is an exemplary flow diagram depicting a second operation of the wireless messaging system in accordance with the present invention.

FIG. 7 is an exemplary flow diagram 700 depicting a second operation of the wireless messaging system in accordance with the present invention. The flow begins when the subscriber unit 122 receives 702 a message, address, and sub-address identifier, preferably an IS message transmitted using well-known techniques. The processing system 206 then checks 704 the address table 224 to determine whether the received address can be found therein. If not, the process ends. If the received address is in the address table 224, the processing system 206 then checks 706 the status of the address. If at step 708 the status indicates that the address is not enabled, the process ends. If the address is enabled, the processing system 206 then checks 710 for the received sub-address identifier and the corresponding sub-address enabler in the sub-address table 226. If at step 712 either the sub-address identifier is missing or the enabler indicates the sub-address is not enabled, the process ends. If the sub-address identifier is present and the sub-address is enabled, then the processing system 206 cooperates with the message processing element 222 to finish processing 714 the message corresponding to the sub-address, which may include displaying the message.

Thus, it should be clear from the preceding disclosure that the present invention advantageously provides a method and apparatus in a wireless messaging system for controlling a hierarchical provision of service, as between, for example, a wireless service provider and an IS provider. The method and apparatus advantageously allows each provider to control selected attributes within areas appropriate to each provider.

Many modifications and variations of the present invention are possible in light of the above teachings. Thus, it is to be understood that, within the scope of the appended claims, the invention can be practiced other than as described herein above.

What is claimed is:

1. In a wireless messaging system, a method for a hierarchical provision of service, comprising the steps of:

initially programming, by a first service provider having a highest security of access, a plurality of tables in a subscriber unit, the plurality of tables comprising:
   an address table having entries comprising addresses to which the subscriber unit is responsive;
   a sub-address table comprising a sub-address identifier and a corresponding first pointer to a first decryption key for an algorithm required to decrypt a sub-message associated with the sub-address identifier; and
   a key table comprising the first decryption key; and
   reprogramming, through a first over-the-air reprogramming message initiated by a second service provider having a security of access less than that of the first service provider, an attribute of at least one of the sub-address table and the key table, wherein the second service provider obtains reprogramming access by encrypting the first over-the-air reprogramming message such that it can be properly decrypted using the first decryption key.

2. The method of claim 1,
   wherein the address table further comprises a second pointer to a second decryption key, and
   wherein the method further comprises the step of reprogramming, by the second service provider, an attribute of the address table, wherein the second service provider obtains reprogramming access by encrypting a second over-the-air reprogramming message such that it can be properly decrypted using the second decryption key.

3. The method of claim 1, wherein the programming step comprises the step of programming the address, sub-address, and key tables through a secure vector accessible to only the first service provider.

4. The method of claim 1, wherein the reprogramming step comprises the step of sending reprogramming information addressed to a personal address of the subscriber unit.

5. The method of claim 1, wherein the reprogramming step comprises the step of sending reprogramming information addressed to a group address of the subscriber unit.

6. The method of claim 1,
wherein the entries further comprise status information corresponding to an address for indicating whether the address is enabled, and
wherein the method further comprises the step of subsequently determining that a received addressed message is not intended for the subscriber unit by locating a matching entry for a received address in the address table, the status information of the matching entry indicating that the address is not enabled.

7. The method of claim 1,
wherein the sub-address table further comprises a sub-address enabler, and
wherein the method further comprises the step of disabling a sub-address when the corresponding sub-address enabler indicates that the sub-address is not enabled.

8. A subscriber unit in a wireless messaging system for a hierarchical provision of service, comprising:
a receiver for receiving a message;
a processing system coupled to the receiver for processing the message; and
a user interface coupled to the processing system for interfacing with a user,
wherein the processing system comprises a memory for storing a plurality of tables initially programmed by a first service provider having a highest security of access, the plurality of tables comprising:
an address table having entries comprising addresses to which the subscriber unit is responsive;
a sub-address table comprising a sub-address identifier and a corresponding first pointer to a first decryption key for an algorithm required to decrypt a sub-message associated with the sub-address identifier; and
a key table comprising the first decryption key, and
wherein the processing system is programmed to allow a second service provider having a security of access less than that of the first service provider to reprogram through a first over-the-air reprogramming message an attribute of at least one of the sub-address table and the key table by encrypting the first over-the-air reprogramming message such that it can be properly decrypted using the first decryption key.

9. The subscriber unit of claim 8,
wherein the address table further comprises a second pointer to a second decryption key, and
wherein the processing system is further programmed to allow the second service provider to reprogram an attribute of the address table by encrypting a second over-the-air reprogramming message such that it can be properly decrypted using the second decryption key.

10. The subscriber unit of claim 8, wherein the processing system is further programmed to allow the first service provider to program the address, sub-address, and key tables through a secure vector accessible to only the first service provider.

11. The subscriber unit of claim 8, wherein the processing system is programmed to allow the second service provider to perform reprogramming by sending reprogramming information addressed to a personal address of the subscriber unit.

12. The subscriber unit of claim 8, wherein the processing system is programmed to allow the second service provider to perform reprogramming by sending reprogramming information addressed to a group address of the subscriber unit.

13. The subscriber unit of claim 8,
wherein the entries further comprise status information corresponding to an address for indicating whether the address is enabled, and
wherein the processing system is further programmed to determine that a received addressed message is not intended for the subscriber unit by locating a matching entry for a received address in the address table, the status information of the matching entry indicating that the address is not enabled.

14. The subscriber unit of claim 8,
wherein the sub-address table further comprises a sub-address enabler, and
wherein the processing system is further programmed to disable a corresponding sub-address when the sub-address enabler indicates that the sub-address is not enabled.

15. A controller in a wireless messaging system operated by a first service provider having a highest security of access, the controller for a hierarchical provision of service, comprising:
a network interface for receiving a message from a message originator;
a processing system coupled to the network interface for processing the message; and
a base station interface coupled to the processing system for controlling a base station to transmit the message; and
a second service provider interface coupled to the processing system for accepting information from a second service provider,
wherein the processing system is programmed to initially download, a plurality of tables to a subscriber unit, the plurality of tables comprising:
an address table having entries comprising addresses to which the subscriber unit is responsive;
a sub-address table comprising a sub-address identifier and a corresponding first pointer to a first decryption key for an algorithm required to decrypt a sub-message associated with the sub-address identifier; and
a key table comprising the first decryption key, and
wherein the processing system is further programmed to allow the second service provider, having a security of access less than that of the first service provider, to reprogram, through a first over-the-air reprogramming message, an attribute of at least one of the sub-address table and the key table by sending the first over-the-air reprogramming message to the subscriber unit, the first reprogramming message encrypted such that it can be properly decrypted using the first decryption key.

16. The controller of claim 15,
wherein the address table further comprises a second pointer to a second decryption key, and
wherein the processing system is further programmed to allow the second service provider to reprogram an attribute of the address table by sending a second over-the-air reprogramming message to the subscriber unit, the second over-the-air reprogramming message encrypted such that it can be properly decrypted using the second decryption key.

17. The controller of claim 15, wherein the processing system is further programmed to allow the first service provider to program the address, sub-address, and key tables through a secure vector accessible to only the first service provider.

18. The controller of claim 15, wherein the processing system is programmed to allow the second service provider to perform reprogramming by sending reprogramming information addressed to a personal address of the subscriber unit.

19. The controller of claim 15, wherein the processing system is programmed to allow the second service provider to perform reprogramming by sending reprogramming information addressed to a group address of the subscriber unit.

* * * * *